May 21, 1963 A. H. BOBECK 3,090,946

ELECTRICAL INFORMATION HANDLING CIRCUITS

Filed Aug. 4, 1958 2 Sheets-Sheet 1

INVENTOR
A. H. BOBECK
BY William H. Kamstra
ATTORNEY

May 21, 1963 A. H. BOBECK 3,090,946

ELECTRICAL INFORMATION HANDLING CIRCUITS

Filed Aug. 4, 1958 2 Sheets-Sheet 2

INVENTOR
A. H. BOBECK
BY William H. Kamstra
ATTORNEY

United States Patent Office 3,090,946

Patented May 21, 1963

3,090,946

ELECTRICAL INFORMATION HANDLING CIRCUITS

Andrew H. Bobeck, Chatham, N.J., assignor to Bell Telephone Laboratories, Incorporated, New York, N.Y., a corporation of New York Filed Aug. 4, 1958, Ser. No. 752,905
6 Claims. (Cl. 340—173)

Figure 1:
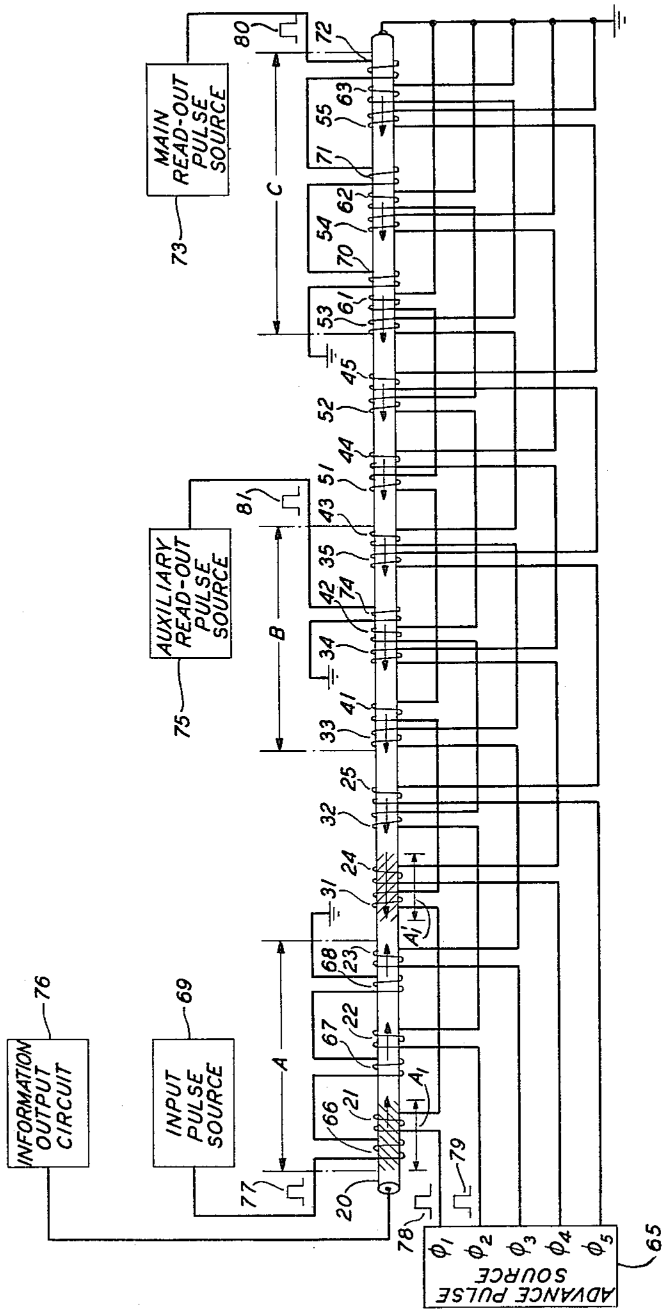

This invention relates to electrical information handling circuits and more particularly to binary electrical delay lines and shift registers.

Electrical information handling circuits employing individual memory elements of a material having substantially nonlinear characteristics whereby the memory elements are enabled to remain in either of two stable states are well known. Such circuits are extensively represented in the art in various and numerous forms and may advantageously employ memory elements of either a ferromagnetic or a ferroelectric material. Ferromagnetic materials of the character contemplated herein display magnetic hysteresis characteristics represented by a rectangularity in the B-H curve of the material. Analogous ferroelectric materials similarly have charge-voltage characteristic curves which are substantially rectangular. These characteristics are manifested in the advantageous ability of the ferromagnetics to remain in either of two magnetic conditions to which driven by an applied magnetomotive force and of the ferroelectrics to remain in either of two conditions of electric charge induced therein by an applied electromotive force. This two-state property of these materials obviously renders memory elements composed thereof highly useful for storing binary information bits.

One well-known information handling circuit in which ferromagnetic and ferroelectric memory elements may be employed is a shift register circuit. In such a circuit binary information may be introduced at one point and temporarily stored or delayed by shifting it along successive information addresses to another point in the circuit. Such a shift register circuit employing ferromagnetic cores as individual memory elements is described, for example, in the "Proceedings of the IRE," April 1951, at page 401, by An Wang. In that shift register circuit and in others employing other two-state devices as individual memory elements, unilateral conducting elements, such as diodes, are frequently necessary circuit components. Thus, for example, diodes are employed to perform an isolation function of blocking backward transfer of information between stages of the register during the activating phase of operation. Wherever it has been necessary to introduce diodes in known shift register circuits for any reason, disadvantages in terms of added cost, higher power requirements, and reliability have been encountered. In view of these and other considerations it becomes highly advantageous to reduce to a minimum or even eliminate the necessity for such diodes.

Shift register arrangements employing ferromagnetic memory elements, such as conventional magnetic toroidal cores, for information storage in each stage, in addition to requiring the assistance of diodes, also present the usual less favorable considerations incident to the use of such memory elements. Thus, for example, in the fabrication of toroidal magnetic core circuits the winding and threading of the cores with the conductors which control and sense the magnetic states may prove costly and time consuming. This very winding and threading may also constitute a limiting factor when it becomes advantageous to reduce the size of the magnetic memory element to its absolute minimum dimensions.

The character of the information stored in a shift register is generally determined when an information bit has been shifted to the point at which the required delay has been accomplished. At this point suitable detection and utilization circuitry is provided to sense the bit. In many shift register and other information handling circuits one of the information bits is destroyed in the process of determining its character. Thus, for example, in magnetic memory arrangements, it is generally necessary to switch the magnetic memory element from one of its magnetic conditions to the other to manifest the presence in the element of one of the binary bits. Thus, where it is required that the information be available in a particular information address for repeated interrogation, it is necessary, for at least one of the binary values, to restore the information to the address after each reading operation. Although this destructive read out in the last stage of a shift register actually serves the purpose of clearing the register for the transmission of subsequent information, it may frequently be advantageous to read the character of an information bit at any selected address in the register without destroying the bit in its traversal of the register.

Accordingly, it is an object of this invention to temporarily store and delay binary information in a new and novel manner without the necessity of employing unilateral conducting elements in the operation.

It is another object of this invention to provide an improved shift register arrangement having a ferromagnetic unitary storage element having advantages in terms of ease of fabrication, size, and reliability.

It is also an object of this invention to provide an improved shift register arrangement employing a ferroelectric element as a unitary information storage means.

Still another object of this invention is the non-destructive read out of an information bit in magnetic memory elements.

A further object of this invention is the storage of binary information in a new and novel memory cell.

The foregoing and other objects are realized according to the principles of this invention in a single memory structure incorporating therein a plurality of information cells or addresses. The memory structure is understood to be divided into a plurality of individually polarizable discrete segments, having an interaction therebetween, with a predetermined number of such segments making up each of the information addresses. Initially the segments of each of the addresses are polarized in the same direction. An information bit such as a binary "1," for example, is introduced into a first address of the memory structure by reversing all of the segments of that address to the opposite direction, in which direction the address group of segments remains for permanent storage of the "1" information bit.

According to aspects of this invention the memory structure may advantageously either comprise a ferromagnetic conductor having a substantially rectangular hysteresis characteristic such as the conductor described in my copending application Serial No. 675,522, filed August 1, 1957, now Patent No. 3,083,353, issued March 26, 1963, or the structure may comprise a ferroelectric element having an analogous substantially rectangular charge-voltage characteristic curve. In the first case the polarization of each discrete segment is magnetic and in the latter case the polarization is that of an electric charge between plates of the element at each segment point. Obviously, an embodiment of the principles of this invention may include any basic memory structure in which discrete segments or elements therein may be individually polarized.

The information bit is shifted along the memory element by simultaneously restoring the first segment of the instant address to its initial polarization and reversing the polarization of the next segment following the last segment of the instant address. A new alignment of segments thus results and the information address has in this manner been shifted one segment position. As an information bit is shifted along the memory element in successive phases of operation, the bit obviously occupies a succession of overlapping bit addresses. When the last address position of the memory element is reached, the information bit may be read out by simultaneously applying a reversing excitation to each of the individual segments of that address. If a binary "1," for example, has been shifted to that position, each of the segments in the last address will be restored to the initial polarization and this reversal of polarization may be detected as a read-out signal.

It is a feature of this invention that means are provided in the ferromagnetic embodiment thereof for detecting a read-out signal directly across the ends of the memory element whenever one or more of the individual segments are reversed in polarity. As a result, read out may be selectively obtained at any one of the overlapping address positions by applying a read-out excitation to each segment of the address position.

It is still another feature of this invention that when any one of the segments of an address position, excepting the segments defining the limits of the address, is reversed in polarity such that its immediately adjoining segments are of opposite polarity, the polarization of the latter segments will operate to restore the one segment to its earlier polarity without the application of external excitation. Thus, by the momentary application of a read current pulse to only one segment of an information address in the ferromagnetic embodiment of this invention, a read-out signal may be detected across the ends of the memory element indicative of the information bit in the entire address. Nondestructive read out is thus realized in the sense that no external power is required to restore the interrogated segment to its information representative state.

The foregoing and other objects and features of this invention will be clearly understood from a consideration of the detailed description thereof which follows when taken in conjunction with the accompanying drawing, in which:

FIG. 1 depicts an illustrative ferromagnetic embodiment of this invention; and

Figure 2:
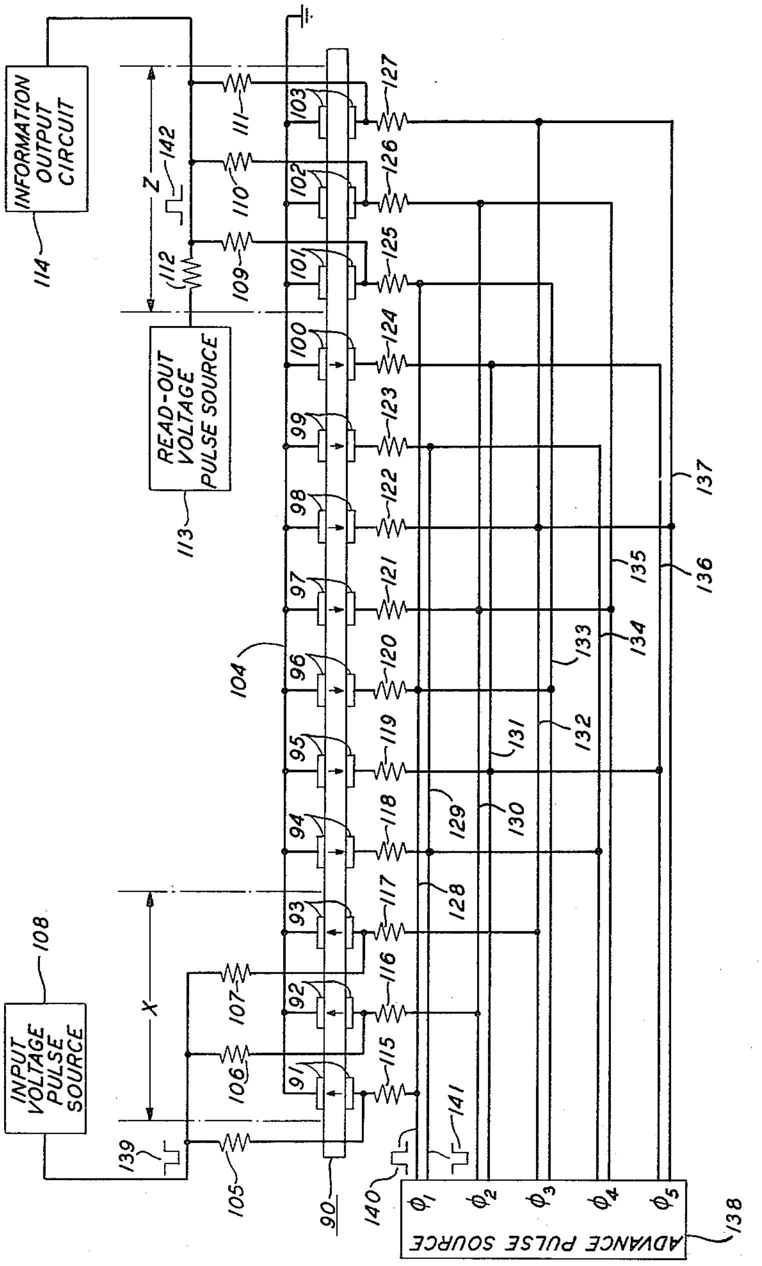

FIG. 2 depicits an illustrative ferroelectric embodiment of this invention.

In FIG. 1 is shown a ferromagnetic embodiment according to the principles of this invention including therein a unitary memory element 20. The element 20, shown exaggerated in relative size for purposes of description, may advantageously comprise an element such as that described in my copending application referred to hereinbefore. Such an element comprises an electrical conductor having a magnetically preferred helical flux path axially coincident therewith. The flux path and, advantageously but not necessarily, the conductor, may be of any well-known ferromagnetic material displaying substantially rectangular hysteresis characteristics. The element 20 may, for example, advantageously comprise a specific element in which the helical magnetic flux path is realized by winding a ferromagnetic wire or tape about an electrical conductor at a given pitch. Such a specific memory element is shown in FIG. 4 of my copending application previously mentioned.

The element 20 is divided into a plurality of individually magnetizable discrete segments by groups of shift windings 21 through 25, 31 through 35, 41 through 45, 51 through 55, and 61 through 63 inductively coupled to the element 20. Thus, in the embodiment of FIG. 1, thirteen such segments are defined successively by the windings singly or in pairs as follows: windings 21, 22, 23, 31 and 24, 32 and 25, 33 and 41, 34 and 42, 35 and 43, 51 and 44, 52 and 45, 53 and 61, 54 and 62, and 55 and 63.

The division of the memory element 20 into segments by the windings as described above provides one of the bases for the operation of this invention. It has been found, in connection with the ferromagnetic embodiment being described, that magnetic interactions exist between closely coupled magnetized regions or segments. It has further been found, in a magnetic element such as the element 20, that these interactions will cause an instability in a magnetized segment adjoining another oppositely magnetized region unless the segment is of at least a minimum dimension. Thus, if such a segment is of less than the minimum dimension and its magnetization is switched to a direction opposite to that of an adjoining stable region, the magnetic interactions between the segment and the adjoining region will restore the segment to its original magnetization as soon as the driving force is removed. The extent of the interactions and minimum stable length of a magnetizable segment obviously will be controlled in part by the particular ferromagnetic material employed.

In determining the foregoing critical minimum stable length of a magnetizable segment of an element 20, it may further be noted that, when a small segment of a relatively long magnetic wire element is magnetized, the axial component of flux must find a return via an air path. The reluctance of this air path places a restriction on the segment length which may be permanently remanently magnetized. Thus, a segment is subjected to demagnetizing fields which increase proportionately as the length of the segment is decreased, and if this length is too small the magnetization of a segment will be unstable once the coercive field is removed. A particular stable segment length in a given case may be closely estimated by adjusting the length so that the demagnetizing fields on the magnetized region equal the applied coercive field. Thus, one basis for the operation of one embodiment of the present invention is the fact that the foregoing demagnetizing fields are strongly influenced by the magnetization state of the remainder of the wire element. The spacing between adjacent stable segments may be established experimentally for a length at which the maximum magnetic interaction is observed. Thus, for example, particular interaction length may be obtained by suitable adjustment of the lengths of the drive windings, the drive fields, or the spacing between the drive windings, or by adjustments of combinations of these factors. When a memory element such as the element 20 is employed, a still further optimizing of the magnetic interaction may be obtained by controlling the degree of twist of the magnetic wire or the pitch of the wound helical flux path.

The length of each of the segments of the memory element 20 as defined by the windings catalogued above is selected as less than the minimum dimension necessary to realize magnetic stability. The segments, however, are of sufficient length such that two adjacent ones comprise a minimal group within which magnetic alignments of a polarity opposite to that of the remaining segments of the element 20 may be maintained with stability. A group of three such adjacent magnetizable segments comprises an advantageous minimal address group which may be shifted along the element 20 in the manner to be described without isolating less than the minimal two oppositely polarized segments during the shift operation. Obviously an address group may comprise more than three adjacent segments should a particular circuit application so dictate. Illustrative of the foregoing address segment groups are those designated A, B, and C in FIG. 1 of the drawing.

The shift windings previously listed are connected in serial combinations in a plurality of advance or shift circuits. As will also become more clear hereinafter, by determining each address group as comprising three individually magnetizable segments, a minimum of five phases of shift current pulses shift an information bit segment by segment along the register without interference among the register windings. The $\varphi_1$ shift circuit comprises the serially connected shift windings 21, 31, 41, 51, and 61; the $\varphi_2$ shift circuit comprises the windings 22, 32, 42, 52, and 62; and the $\varphi_3$ shift circuit, the windings 23, 33, 43, 53, and 63. The $\varphi_4$ shift circuit comprises the serially connected shift windings 24, 34, 44, and 54; and finally, the $\varphi_5$ shift circuit comprises the shift windings 25, 35, 45, and 55. Each of the $\varphi_1$ through $\varphi_5$ shift circuits is connected between ground and an advance current pulse source 65. The latter source 65 may conveniently comprise any of the sequential switches well known in the art capable of providing successive current pulses of a polarity and magnitude such as to provide the necessary magnetomotive forces for reversing the magnetic conditions of the address segments.

Also inductively coupled respectively to the discrete segments of the first information address A are three input windings 66, 67, and 68, which windings are serially connected between ground and an information input source 69. Inductively coupled respectively to the discrete segments of the last information address C are three read-out windings 70, 71, and 72, which windings are serially connected between ground and a main read-out pulse source 73. An auxiliary read-out winding 74 is inductively coupled to the center segment of the information address B and is connected between ground and an auxiliary read-out pulse source 75. The information address B obviously may be any address between the two terminal addresses A and C in which the character of the information is to be determined. Although the means are not shown in the drawing, more than one address may be interrogated by the provision of additional read-out windings and pulse sources suitably timed for nonconcurrent operation.

The memory element itself is connected at one terminus to ground and at the other to an information output circuit 76 capable of accepting output voltage signals and transmitting them to interested associated circuitry, not shown.

Although the windings described as being coupled to the memory element 20 are shown in FIG. 1 adjacent each other, where more than one such winding is coupled to the same memory segment, one may actually encompass the other. Thus, the windings are shown in FIG. 1 particularly to emphasize the principles of this invention without excluding other winding arrangements capable of accomplishing the driving function. Initially each of the segments of the helical magnetic flux path of the element 20 defined by the shift windings of the shift circuits may be assumed to be magnetized in a direction which, for convenience of description, may be understood as being to the left as viewed in FIG. 1 of the drawing and as represented by the arrows at each except the first information address A. During the input phase of operation, an information bit such as a binary "1" may be introduced by the application of a positive input current pulse 77 from the source 69. This current pulse is simultaneously applied to the input windings 66, 67, and 68 and the sense of the latter windings is such that all of the segments of the information address A are reversed in polarity to represent the "1" binary value. This polarity reversal is represented in FIG. 1 by arrows directed to the right at each of the segments of address A. This bit may now be shifted along the memory element 20 in the succeeding advance phase of operation. This advance phase comprises the application of a plurality of sequential advance or shift current pulses to the shift circuits $\varphi_1$ through $\varphi_5$. A positive advance current pulse 78 is first applied to the shift circuit $\varphi_1$ which current pulse develops magnetomotive forces in the element 20 at the segments and in directions as determined by the sense of each of the serially connected shift windings 21, 31, 41, 51, and 61. The winding 21 defining the first segment $A_1$ of the information address A containing the binary "1," shown as shaded in FIG. 1, is in a sense such as to reverse the magnetic polarity of this segment thereby restoring it to its initial or normal polarity. The winding 31 which defines the segment $A_1'$ following the last segment of the address A, also shown as shaded, is wound in the opposite sense so that the segment $A_1'$ will be switched from its normal magnetic polarity to that determined as representing a binary "1." The remaining two segments of the information address A will be magnetically unaffected due to the inherent magnetic stability of the ferromagnetic material of the element 20. As was previously mentioned, this stability advantageously permits the isolation of at least two adjacent segments having a magnetic polarity opposite to that of the other discrete segments of the element 20.

As a result of the application of the $\varphi_1$ shift current pulse 78, the binary "1," initially contained in the address A, has been shifted one segment to the right as viewed in FIG. 1. The new address obviously overlaps the address A by two segments. The shift current pulse 78 is also applied to the shift windings 41, 51, and 61 and a flux reversal will also occur at segments of the element 20 defined by these windings. However, the latter segments are isolated single segments and the interaction of the flux of the segments adjacent either side of each will, without the application of external force, restore these segments to their normal magnetic states.

The application of sequential shift current pulses to the subsequent shift circuits $\varphi_2$ through $\varphi_5$ is continued to effect the progressive shift of the information bit "1" along the register. Thus, the positive current pulse 79 applied to the shift circuit $\varphi_2$ reverses the magnetic polarity of the first segment of the instant information address and also of the segment immediately following that of the last segment of the instant information address. The latter two segments are defined respectively by the shift winding 22 and the pair of windings 32 and 25. Following the energization of the $\varphi_2$ shift circuit the information address at that point still overlaps by one segment the information address A, the resulting information address comprising the segments defined by the shift winding 23, the pair of windings 31 and 24, and the pair of windings 32 and 25. Upon the application of a shift current pulse to the $\varphi_3$ shift circuit the information bit will be shifted in a similar manner to the information address, the first segment of which is the segment $A_1'$. This segment is partially defined by the winding 31 of the $\varphi_1$ shift circuit. The winding 31 however is of a sense opposite to that required to effect the flux reversal in the segment $A_1'$ needed to continue the further shift of the information bit. As a result, a fourth shift circuit $\varphi_4$, including the properly wound winding 24 of the segment $A_1'$, is provided. When the latter shift circuit is energized, the information bit is shifted to the address including the segments defined by the shift winding pairs 32 and 25, 33 and 41, and 34 and 42. At this point the energization of one additional shift circuit $\varphi_5$ is required before the cycle of shift current pulses may be repeated with a pulse applied to the $\varphi_1$ circuit. Upon the application of a positive shift current pulse such as the pulses 78 and 79 to the $\varphi_5$ shift circuit, the segments partially defined by the windings 25 and 35 will be reversed in polarity, the former being restored to its normal magnetic condition and the latter being switched to the polarity representing the binary "1." The information bit has thus been shifted to the information address designated B in FIG. 2. The $\varphi_1$ through $\varphi_5$ shift circuit energization cycle may be repeated when the information bit has advanced to the address B. At this point the $\varphi_1$ shift circuit may again be pulsed without interfering with address segments which must be maintained magnetically unaffected. By the continued application of shift current pulses to the shift circuits in the manner described the information bit may be advanced to the last information address C of the register.

At this time the advance pulse source 65 may be interrupted and the character of the information bit in the address C determined. A positive read-out current pulse such as the pulse 80 is applied from the main read-out pulse source 73 to the serially connected read-out windings 70, 71, and 72. The sense of the latter windings is such that the magnetic polarities of the segments of the element 20 partially defined by the latter windings are restored to their normal magnetic conditions. The simultaneous reversal of the magnetic flux in the helical flux path segments of the information address C induces an output voltage across the ends of the memory element 20 in accordance with the principles of this memory element generally. This voltage, here indicative of a binary "1," may be detected and transmitted to associated utilization circuits, not shown, by the information output circuit 76.

Should a binary "0" have been present in the information address C, in which case each of the segments of that address would have remained in its normal magnetic condition, only a negligible flux excursion would have taken place in those segments as a result of the application of the positive current pulse 80 and only a negligible output voltage would have been generated between the ends of the element 20. Such a negligible voltage signal may readily be distinguished from the signal representing a binary "1" by circuitry well known in the art. A complete traversal of an information bit from one end of the shift register or delay line of this invention to the other has thus been described.

It may be convenient, in particular circuit applications, to determine the character of the information bit stored in an intermediate information address such as the address B. In this case the application of the shift current pulses may be interrupted and a positive read-out current pulse 81 applied from the auxiliary read-out pulse source 75 to the auxiliary read-out winding 74 inductively coupled to the center segment of that address. Should at the moment of read out a binary "1" be stored therein, the magnetic polarity of the latter segment will be reversed and an output voltage will again be induced across the ends of the element 20 indicative of that information bit. This output voltage signal may also be detected by the information output circuit 76. Upon the completion of the current pulse 81 to the auxiliary output winding 74, no further power need be applied to restore the center segment of the address B to its information representative magnetic state. As previously mentioned, the magnetic interaction of the magnetic flux of the segments adjacent either side will restore that segment to its magnetic state representative of the binary "1." As soon as the latter restoration has taken place the normal advance of the information bit by the application of further shift current pulses may be continued.

The register according to this invention just described may advantageously be made reversible in a number of ways. The register particularly shown in FIG. 1 may be made to propagate information in the reverse direction by reversing both the polarity and sequence of the advance pulses. If an additional phase of advance or shift current pulses is provided, the register may be made reversible merely by changing the sequence of the advance pulses.

Another shift register arrangement embodying the principles of this invention is shown in FIG. 2. The single memory element 90 comprises a ferroelectric slab which is capable of maintaining a charge after the removal of an inducing voltage applied to opposing plates. The element 90, when provided with suitable electrodes or plates, thus comprises a nonlinear multiple capacitor having a dielectric of a material which displays a substantially rectangular charge-voltage characteristic curve. Such materials are well known in the art and will maintain a charge of one or the other polarities unless a reversing voltage of sufficient magnitude is applied. It is known, however, that in such materials a minimum length of a charged region exists below which the charge will be influenced by interactions from adjacent charged regions. Thus, any region below this length will be unstable and cannot be relied upon to maintain its charge. Any length over this minimum length as, for example, two such regions both of which are under this minimum length, on the other hand, will exhibit the nonlinear property described above.

The ferroelectric element 90 is divided into a plurality of separately chargeable capacitor segments, the length of each of which is less than that of one of the minimal stable regions described above, by a plurality of pairs of plates 91 through 103. Groups of the segments thus defined make up a plurality of overlapping information addresses on the memory element 90. Thus, for example, the segments defined by the pairs of plates 91, 92, and 93 make up the first information address designated as X. One plate of each of the pairs of plates 91 through 103 is connected to a ground bus 104 and the other plate of each pair of plates is connected in an information shift network in the manner to be described hereinafter. The latter plates of the plate pairs 91, 92, and 93 of the first information address X are parallelly connected respectively through resistors 105, 106, and 107 to an input voltage pulse source 108. The latter source may be any suitable source well known in the art capable of providing voltage pulses of the polarity and magnitude required to charge simultaneously the information address X segments.

The ungrounded plates of the plate pairs 101, 102, and 103 defining the segments of the last information address Z are parallelly connected respectively through resistors 109, 110, and 111 and a series resistor 112 to a read-out voltage pulse source 113. The latter source may also comprise any suitable voltage source well known in the art capable of providing read-out voltage pulses of the character and at the time to be described hereinafter. Connected between the resistor 112 and the parallel resistors 109, 110, and 111 is an information output circuit 114. The ungrounded plates of each of the plate pairs 91 through 103 are connected respectively through a plurality of isolating resistors 115 through 127 to a five phase shift or advance network by means of which shift voltage pulses are sequentially applied to the plates to effect the shift of information along the register. As was the case in connection with the shift currents of the magnetic embodiment of this invention previously described, shift potentials of opposing polarities are simultaneously applied to the address segments in each shift circuit in order to advance an information bit segment by segment along the register. Accordingly, in the instant embodiment, each of the advance circuits comprises dual circuit means to carry the opposing voltage shift pulses. Thus, the $\varphi_1$ shift circuit comprises the conductor pairs 128 and 129; the $\varphi_2$ shift circuit comprises the conductor pairs 130 and 131; the $\varphi_3$ shift circuit comprises the conductor pairs 132 and 133; the $\varphi_4$ shift circuit comprises the conductor pairs 134 and 135; and the last, $\varphi_5$ shift circuit comprises the conductor pairs 136 and 137. The conductor pairs are interconnected between the ungrounded plates of the plate pairs 91 through 103 and an advance voltage pulse source 138 in the manner following. Conductor 128 is parallelly connected through resistors 115, 120, and 125 to the ungrounded plates of the plate pair 91, 96, and 101, respectively. Conductor 129 is parallelly connected through resistors 118 and 123 to the ungrounded plates of the plate pairs 94 and 99, respectively. Conductor 130 is connected through the parallel resistors 116, 121, and 126 to the ungrounded plates of the plate pairs 92, 97, and 102, respectively. Conductor 131 is connected through the parallel resistors 119 and 124 to the ungrounded plates of the plate pairs 95 and 100, respectively.

The interconnections of the conductor pairs of the shift network are continued with the connection of the conductor 132 through the parallel resistors 117, 122, and 127 to the ungrounded plates of the plate pairs 93, 98, and 103, respectively. The conductor 133 is connected to each of the ungrounded plates of the plate pairs 96 and 101 through the parallel resistors 120 and 125, respectively. The conductor 134 is parallelly connected to the ungrounded plates of the plate pairs 94 and 99 through the resistors 118 and 123, respectively, and the conductor 135 is parallelly connected to the ungrounded plates of the plate pairs 97 and 102 through the resistors 121 and 126, respectively. Finally, the conductor pairs 136 and 137 are connected to the ungrounded plates of the plate pairs 95 and 100, and 98 and 103, respectively, through the respective parallel resistors 119 and 124, and 122 and 127. The pulse source 138 may advantageously comprise any suitable sequential switching means capable of providing a sequence of substantially simultaneous pairs of oppositely poled voltage pulses of a magnitude sufficient to reverse the charge condition of the particular ferroelectric material comprising the memory element 90.

The operation of the ferroelectric embodiment of this invention shown in FIG. 2 is substantially similar to that described for the ferromagnetic embodiment described hereinbefore. The operation of either embodiment is dependent upon the fact of polarity reversal in the individual address segments rather than upon the particular direction in which the reversal takes place. Accordingly, in keeping with the directions of the charges between the plate pairs 91 through 103, the address capacitor segments defined by these plate pairs may be understood as normally charged transversely downward as viewed in FIG. 2. That is, in accordance with the polarity of the energizing voltage pulses to be described, the grounded plates of the plate pairs are normally negatively charged and the opposite plates are normally positively charged. These charges are symbolized by downwardly directed arrows in FIG. 2 between the plate pairs 94 through 100. During the input phase of operation, an information bit such as a binary "1" may be introduced by the application of a negative input voltage pulse 139 from the source 108. This voltage pulse is applied across the parallel isolating resistors 105, 106, and 107 to the ungrounded plates of the plate pairs 91, 92, and 93, respectively. The capacitor segments defined by the latter plate pairs making up the address X will each be reversed from its normal direction of charge and assume a charge as symbolized by the upwardly directed arrows in FIG. 2, to represent the "1" binary value.

This bit may now be shifted along the memory element 90 in the succeeding advance phase of operation. This advance phase comprises the application of a plurality of pairs of oppositely poled sequential advance or shift voltage pulses to the dual shift circuits $\varphi_1$ through $\varphi_5$. A positive advance voltage pulse 140 is first applied to the conductor 128 of the $\varphi_1$ circuit substantially simultaneously with the application of a negative advance voltage pulse 141 to the conductor 129 of the same circuit. The oppositely poled pulses 140 and 141 are applied to the plate pairs 91 and 94 through the isolating resistors 115 and 118, respectively. As a result, the charge in the capacitor segment defined by the plate pair 91 is reversed to its normal polarity and the charge in the segment defined by the plate pair 94 is reversed from its normal polarity. The intermediate capacitor segments defined by the plate pairs 92 and 93 will be electrostatically unaffected due to the inherent stability of the material of the element 90. As was previously mentioned, this stability advantageously permits the isolation of at least two adjacent segments having a charge of opposite polarity to that of the other discrete segments of the element 90.

As a result of the application of the $\varphi_1$ shift voltage pulses 140 and 141, the binary "1," initially contained in the address X, is shifted one capacitor segment to the right as viewed in FIG. 2. The latter shift voltage pulses are also applied respectively to the plate pairs 96 and 101, and to the plate pair 99. In the case of the plate pairs 96 and 101, the segments defined therebetween are already in a charge state to which the voltage pulse 140 tends to place it so these segments will be unaffected. The capacitor segment defined by the plate pair 99 is an unstable single segment and, although it will be reversed in polarity by the voltage pulse 141, it will be restored by the electrostatic interaction of its adjacent segments upon the termination of the voltage pulse 141 without further external excitation.

As oppositely poled shift voltage pulses are sequentially applied simultaneously to the conductor pairs of the dual shift circuits $\varphi_1$ through $\varphi_5$ in repeated cycles of operation, the information bit "1" is advanced segment by segment through the overlapping information addresses in the manner described for the first segment shift. This manner of operation in the sequential application of pairs of shift voltage pulses to the shift circuits is obviously completely analogous to the shift of an information bit by the sequential application of a single shift current pulse to the shift circuits of the ferromagnetic embodiment of this invention previously described. Ultimately the information bit—here a binary "1"—will be advanced to the last information address Z of the register. At this time the advance pulse source 138 may be interrupted and the character of the information bit presently contained in the address Z determined. A positive read-out voltage pulse 142 is applied from the source 113 across the serial isolating resistor 112 and parallel resistors 109, 110, and 111 to the ungrounded plates of the plate pairs 101, 102, and 103 respectively. The charge of each of the capacitor segments making up the last information address Z defined by the latter plate pairs will be reversed to its normal polarity since in the operation being described a binary "1" was advanced to this last address. The fact of the simultaneous reversal of charges in the capacitor segments of the last address may be detected as a potential drop across the resistor 112 which signal may be detected by the information output circuit 114 and transmitted thereby to associated utilization circuitry, not shown.

Should a binary "0" have been present in the information address Z, in which case each of the segments of that address would have remained in its normal charge state, only a negligible charge change would have taken place in those segments as a result of the application of the positive voltage pulse 142 and only a negligible output signal would have been detected by the output circuit 114. Such a negligible output signal may readily be distinguished from the signal representing a binary "1" by circuitry well known in the art. A complete traversal of an information bit from one end of the shift register embodiment of FIG. 2 to the other has thus been described.

What have been described are considered to be only illustrative embodiments of this invention and it is to be understood that various and numerous other arrangements may be devised by one skilled in the art without departing from its spirit and scope. The features and aspects of this invention described but not claimed herein are claimed in my copending application, Serial No. 240,617, filed November 28, 1962.

What is claimed is:

1. A magnetic shift register comprising an elongated magnetic medium characterized as having an overall magnetic orientation in a predetermined direction with respect to its elongated axis, segments of said medium being magnetically unstable when magnetized in lengths less than a minimum dimension as determined by the magnetic interactions of the remainder of said magnetic medium and said segments, read-in inductive means magnetically coupled to a portion of said magnetic medium, an electrical information source adapted to be connected to said read-in inductive means for establishing a discrete zone of magnetization in said medium having a magnetic orientation of an opposite direction to that of the medium, said zone being made up of at least two immediately adjoining ones of said segments of said medium, a plurality of propagating inductive means magnetically coupled to said medium longitudinally thereof including the portion of said medium coupled by said read-in inductive means, said propagating inductive means being coupled and disposed with respect to said medium to be effective at spaced apart intervals, electrical driving means adapted to be sequentially connected to said propagating inductive means for shifting the zone longitudinally through said magnetic medium, and a read-out inductive means magnetically coupled to only a single one of said segments of said medium at a point thereon to derive an electrical information pulse in response to the magnetic switching of said last-mentioned segment by said read-out inductive means.

2. An information storage cell comprising an electrical conductor element having a magnetic tape helically wound therearound, said tape being normally magnetized in one direction, said tape being capable of assuming stable magnetic states in the opposite direction in discrete portions thereof when said portions are at least a minimum length as determined by the magnetic interactions of the magnetization of the remainder of said tape and said discrete portions, means for setting more than two immediately adjoining segments of said tape each being less than said minimum length to said stable state in said opposite direction representative of a binary value, read-out means including a winding coupled only to an intermediate one of said last-mentioned segments for reversing the magnetic state of only said last-mentioned segment to said one direction, and means for detecting voltage changes between the ends of said conductor element indicative of said binary value.

3. An electrical circuit comprising a conductor element having a magnetic tape helically wound therearound, a plurality of windings inductively coupled to respective segments of said conductor element and said tape, each of said segments being of lengths less than the minimum length of said tape for magnetic stability as determined by magnetic interactions of said segments and said tape, each of said segments also being of lengths such that combinations of two adjoining ones of said segments are capable of assuming either of two remanent magnetic states, said tape normally being magnetized in one magnetic state, means for switching a group of at least two adjoining ones of said segments to the other magnetic state, means for extending said group comprising means for applying switching current pulses to the windings of successive additional immediately adjoining segments adjoining the last segments of said group to switch said successive additional adjoining segments to said other magnetic state, means for restoring the magnetic state of one predetermined isolated segment of said group to said one magnetic state including a read-out winding coupled only to said last-mentioned isolated segment, and means for detecting magnetization changes between the ends of said conductor element.

4. A memory circuit comprising a wire having a magnetic tape helically wound therearound, said tape being normally magnetized in one direction and being capable of assuming a stable magnetic state in the opposite direction in a discrete region thereof when said region is at least a minimal dimension as determined by the magnetic interactions of the remainder of said tape and said discrete region, means including first windings inductively coupled to said tape for magnetizing a region of said tape having a dimension longer than said minimal dimension in said opposite direction, means for extending said region comprising means including second windings inductively coupled to said tape for switching the magnetic state of immediately adjoining segments each having a length less than said minimal dimension immediately adjoining one side of said region to said opposite direction, read-out means including a third winding inductively coupled to only one of said segments within said region for subsequently switching the magnetic state of said last-mentioned segment back from said opposite direction to said one direction, and means for detecting magnetization changes between the ends of said wire.

5. A memory circuit as claimed in claim 4 also comprising means including fourth windings inductively coupled to said tape for switching the magnetic state of immediately adjoining segments each having a length less than said minimal dimension at the other side of said region back from said opposite direction to said one direction substantially simultaneously with said switching of said segments immediately adjoining the one side of said region to said opposite direction.

6. In an electrically conductive wire having a magnetic tape helically wound therearound, discrete portions of said tape being magnetically unstable when magnetized in a length having less than a minimal dimension as determined by the magnetic interactions of magnetized other portions of said tape and said discrete portions, said discrete portions being capable of assuming either of two stable flux states when said discrete portions are longer than said minimal dimension, a memory cell comprising means including windings coupled to said tape for magnetizing a region of said tape longer than said minimum dimension to one of said stable flux states representative of a particular binary value, said region comprising a plurality of immediately adjoining unstable segments of said tape each having a length less than said minimal dimension, means including another winding coupled only to an intermediate one of said segments for momentarily switching the flux state of said last-mentioned segment, and means for detecting voltage changes between the ends of said wire responsive to said last-mentioned switching of said intermediate segment.

References Cited in the file of this patent

UNITED STATES PATENTS

| | | |
|---|---|---|
| 2,839,738 | Wofe | June 17, 1958 |
| 2,847,659 | Kaiser | Aug. 12, 1958 |
| 2,919,432 | Broadbent | Dec. 29, 1959 |

OTHER REFERENCES

The Bell System Technical Journal, vol. XXXVI, November 1927, No. 6, "A New Storage Element Suitable for Large-Sized Memory Arrays—The Twistor," by Bobeck.

Physical Review, No. 1, 1932, vol. 42, "Propagation of Large Barkhausen Discontinuities," by Sixtus & Tonks. Copy in Div. 42.